(12) United States Patent
Berkel et al.

(10) Patent No.: US 9,116,074 B2
(45) Date of Patent: Aug. 25, 2015

(54) MEASURING PLUG AND METHOD FOR ASSEMBLING A MEASURING PLUG

(71) Applicants: Engbertus Berkel, Wierden (NL); Bart Jan Mathijs Salden, Heeten (NL); Jochem Hendrik Talsma, Deventer (NL)

(72) Inventors: Engbertus Berkel, Wierden (NL); Bart Jan Mathijs Salden, Heeten (NL); Jochem Hendrik Talsma, Deventer (NL)

(73) Assignee: Sensata Technologies, Inc., Attleboro, MA (US)

( * ) Notice: Subject to any disclaimer, the term of this patent is extended or adjusted under 35 U.S.C. 154(b) by 0 days.

(21) Appl. No.: 14/188,969

(22) Filed: Feb. 25, 2014

(65) Prior Publication Data

US 2014/0283586 A1    Sep. 25, 2014

(30) Foreign Application Priority Data

Mar. 20, 2013  (EP) .................................... 13160268

(51) Int. Cl.
*G01M 15/08* (2006.01)
*G01L 19/00* (2006.01)
*G01L 19/14* (2006.01)
*G01L 23/18* (2006.01)

(52) U.S. Cl.
CPC ........... *G01M 15/08* (2013.01); *G01L 19/0069* (2013.01); *G01L 19/148* (2013.01); *G01L 23/18* (2013.01); *Y10T 29/49155* (2015.01)

(58) Field of Classification Search
CPC ... G01L 23/18; G01L 19/148; G01L 19/0069; F02P 19/028; F02B 77/085; F02D 35/023; G01M 15/08; Y10T 29/49155
USPC ........................................... 73/114.16, 114.18
See application file for complete search history.

(56) References Cited

U.S. PATENT DOCUMENTS

| 7,316,164 B2* | 1/2008 | Toyoda et al. ................... 73/723 |
| 7,464,604 B2* | 12/2008 | Takeuchi et al. ................ 73/756 |
| 7,628,078 B2* | 12/2009 | Matsui et al. .................... 73/715 |
| 2006/0090566 A1* | 5/2006 | Oda ................................. 73/715 |
| 2007/0113660 A1* | 5/2007 | Matsui ............................. 73/715 |
| 2008/0053237 A1* | 3/2008 | Matsui et al. ................... 73/756 |
| 2009/0080492 A1* | 3/2009 | Takeuchi ....................... 374/144 |
| 2009/0095059 A1* | 4/2009 | Matsui et al. ............... 73/114.18 |

* cited by examiner

*Primary Examiner* — Freddie Kirkland, III
(74) *Attorney, Agent, or Firm* — Chapin IP Law, LLC

(57) ABSTRACT

Disclosed is a pressure-measuring plug for a combustion engine. An interconnection structure in the plug body electrically couples by means of a flexible printed circuit board (PCB) an electrical sensing element at one end of the plug body to connector terminals of the plug at the other end of the plug body. An elongated support structure fixates a part of the flexible PCB in the plug body to enable the flexible PCB to withstand automotive conditions and to facilitate during assembly to put the flexible PCB through the hollow plug body.

11 Claims, 3 Drawing Sheets

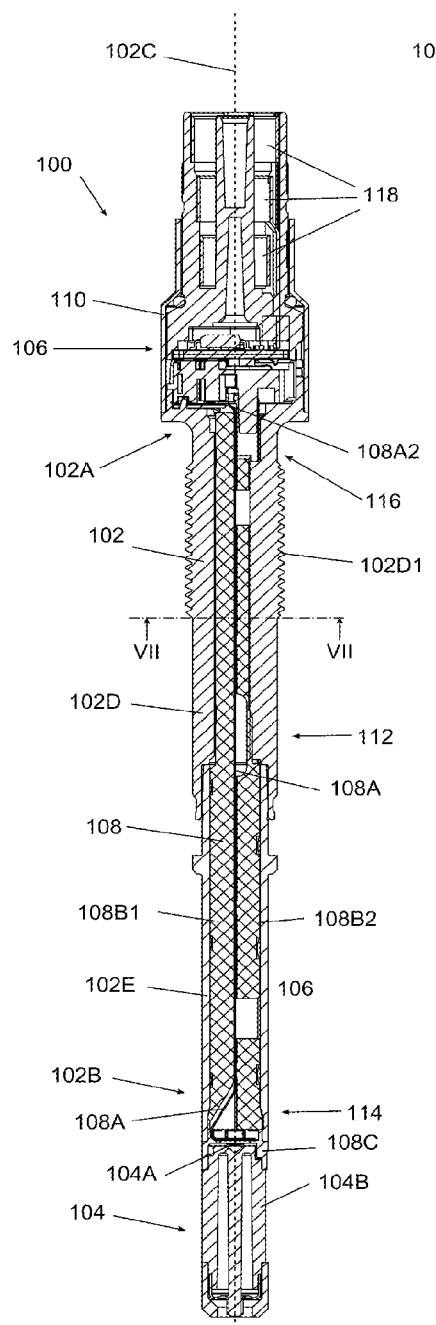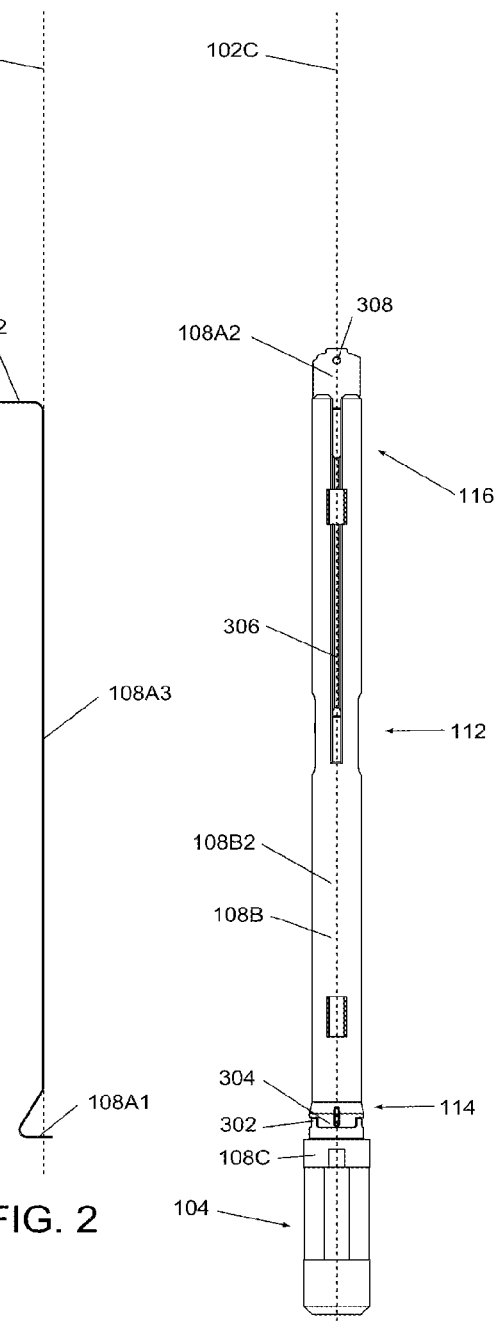
FIG. 1　FIG. 2　FIG. 3

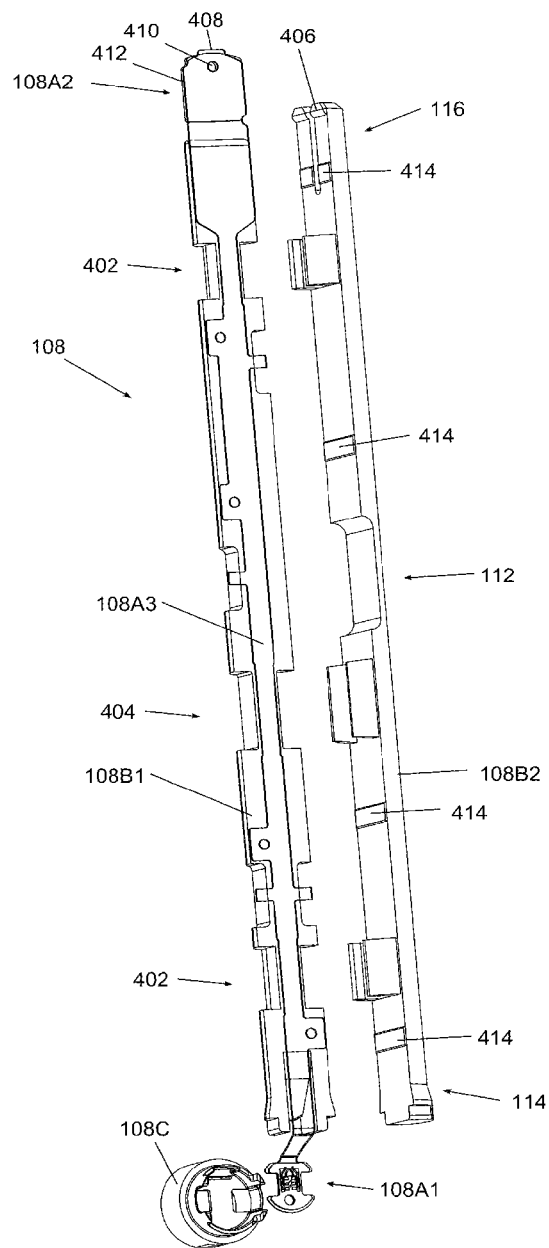
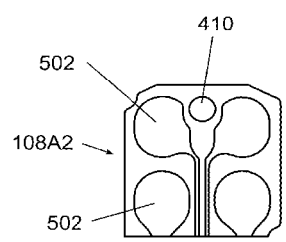
FIG. 5
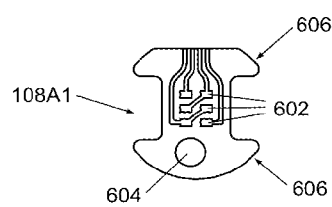
FIG. 6
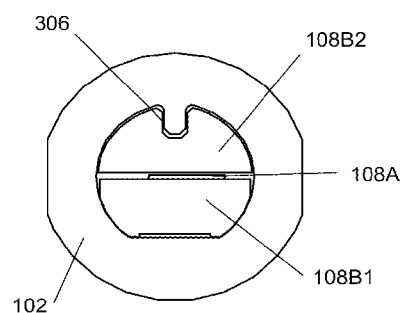
FIG. 7
FIG. 4

MEASURING PLUG AND METHOD FOR ASSEMBLING A MEASURING PLUG

CROSS REFERENCE TO RELATED APPLICATIONS

This application claims priority to European Patent Application No. 13160268.2, filed Mar. 20, 2013.

TECHNICAL FIELD

The invention relates to a measuring plug and a method for assembling a measuring plug. More particularly, the invention relates to a piezo-resistive pressure-measuring plug for a combustion engine.

BACKGROUND OF THE INVENTION

Advanced combustion strategies for gasoline engines in the future depend on the existence of accurate pressure feedback from each combustion cylinder during the entire cycle (compression-combustion-exhaust cycle). These strategies may or may not include Homogeneous Charge Compression Ignition (HCCI) combustion, and can result in high pressure release rates which require fast and accurate pressure response.

A piezo-resistive pressure-measuring plug is known from EP2138819A1. The pressure-measuring plug comprises a very small sensing element that can be placed near the combustion side and therefore a very high bandwidth sensor is feasible. By means of bonding wires, the sensing elements are electrically coupled with sensor electronics on a printed wiring board (PWB) which is located in the plug body. The sensor electronics is arranged to measure a resistance change of the piezo-resistive elements mounted on a sensing structure and to generate a conditioned measurement signal therefrom. Connector terminals are arranged in a housing which is attached to the plug body. The connector terminals are electrically coupled via the sensor electronics to the sensing element arranged in the plug body. The document does not disclose how to obtain a reliable electrical connection between the piezo-resistive elements arranged in the plug body and the electronic parts outside the plug body. The electrical connection has to withstand the high temperature and vibrations typical to an environment of an internal combustion engine.

SUMMARY OF THE INVENTION

It is an object of the present invention to provide an improved measuring plug with a structure which is at least one of: reliable, cheaper to manufacture, producible in high volume by means of semi- or full automatic production processes, long lasting and/or robust to harsh pressure media, withstanding the high temperature and vibration typical of an internal combustion engine.

According to a first aspect of the invention, this object is achieved by a measuring plug having the features of claim 1. Advantageous embodiments and further ways of carrying out the invention may be attained by the measures mentioned in the dependent claims.

A measuring plug according to the invention is characterized in that the measuring plug further comprises an interconnection structure which provides an electrical connection through the hollow plug body. The interconnection structure is at least partially located in the hollow plug body. The interconnection structure comprises a flexible PCB with first contact areas at a proximal end part of the flexible PCB and second contact areas at a distal end part of the flexible PCB. The first contact areas are electrically coupled to the electrical sensing element by means of bonding wires. The proximal end part of the flexible PCB is positioned in the hollow plug body in a plane which is perpendicular to the plug body axis. The interconnection structure further comprises an elongated support structure configured to fixate a part of the flexible PCB between the proximal end and the distal end of the flexible PCB in the hollow plug body.

These features provide an interconnection between sensing element and conditioning electronics which can connect over a total distance of at least 100 mm. The interconnection can withstand automotive engine temperature and vibration requirements. It is suitable to accept a wire bond system at one end and allows high volume assembly. The elongated support structure facilitates during assembly of the measuring plug to put the flexible PCB through the hollow plug body.

In an embodiment, the interconnection structure further comprises a ring-shaped support structure wherein the proximal end of the flexible PCB is attached to the ring-shaped support structure and the ring-shaped support structure is attached to the sensing structure. This feature provides an interconnection structure which could be pre-assembled and used as one component at assembly of the measuring plug. This reduces the complexity of the manufacturing process.

In an embodiment, the ring-shaped support structure comprises an alignment structure to cooperate with a corresponding alignment structure of the elongated support structure. The alignment structure is configured to align the part of the flexible PCB located between the two end parts of the flexible PCB and the proximal end part of the flexible PCB. These features reduce the amount of stress in the flexible PCB due to warping.

In an embodiment, the ring-shaped support structure and the sensing structure form a cavity housing the electrical sensing element, the proximal end of the flexible PCB and the bonding wires. The cavity is configured to hold together a protective gel which covers the electrical sensing elements to protect them against corrosion.

In an embodiment, the ring-shaped support structure forms a part of the exterior of the measuring plug. These features enable to reduce the diameter of the measuring plug.

In an embodiment, the elongated support structure comprises a first part and a second part. The flexible PCB is positioned between the first part and the second part. These features provide a simple construction to support the flexible PCB through the hollow plug body. In a further embodiment, the first part and the second part comprises a snap fit coupling structure to couple the first part to the second part. In this way it is easy to pre-assemble the interconnection structure.

In an embodiment, the elongated support structure comprises a protruding edge configured to pre-bend the flex. This feature reduces the complexity of the manufacturing process of the measuring plug.

In an embodiment, wherein the elongated support structure comprises a press fit structure to fixate the elongated support structure in the hollow plug body. As a result of these features, the flexible PCB can withstand the vibration requirements.

In an embodiment, the hollow plug body comprises a top part with a structure to position the electronic circuitry. A hole through the hollow plug body provides a passage for the interconnection structure. The through hole and the elongated support structure comprising corresponding alignment structures configured to align the top part with the elongated support structure. These features reduce the complexity of the manufacturing process and reduce the risk of stress in the flexible PCB after assembly.

In an embodiment, at least a part of the electronic circuitry is mounted on the flexible PCB. In this way, the volume of the housing could be reduced.

In an embodiment, the sensing structure is a pressure sensing structure and the electrical sensing element comprises a number of strain gauges. The strain gauges are preferably piezo resistive sensing elements.

In a second aspect there is provided a method of assembling a measuring plug. The method comprises:
  providing an interconnection structure comprising a flexible PCB with first contact areas at a proximal end part of the flexible PCB and second contact areas at a distal end part of the flexible PCB and an elongated support structure configured to fixate a part of the flexible PCB between the proximal end part and distal end part of the flexible PCB in a hollow plug body;
  electrically coupling the first contact areas to an electrical sensing element of a sensing structure by means of bonding wires;
  positioning the elongated support structure perpendicular to the proximal end part of the flexible PCB; and,
  sliding the interconnection structure in a hollow plug body allowing the proximal end of the flexible PCB to be positioned in the hollow plug body in a plane which is perpendicular to a plug body axis and the distal end to protrude out of the hollow plug body for further assembly.

Other features and advantages will become apparent from the following detailed description, taken in conjunction with the accompanying drawings which illustrate, by way of example, various features of embodiments.

BRIEF DESCRIPTION OF THE DRAWINGS

These and other aspects, properties and advantages will be explained hereinafter based on the following description with reference to the drawings, wherein like reference numerals denote like or comparable parts, and in which:

FIG. 1 shows schematically a sectional view of an embodiment of a pressure-measuring plug;

FIG. 2 shows schematically the path of the flexible PCB in the embodiment shown in FIG. 1;

FIG. 3 shows schematically a side view of the sensing structure and interconnection structure;

FIG. 4 shows schematically an exploded view of the interconnection structure;

FIG. 5 shows schematically a top view of the distal end part of the flexible PCB;

FIG. 6 shows schematically a top view of the proximal end part of the flexible PCB;

FIG. 7 shows a cross sectional view of the pressure-measuring plug along the line VII-VII in FIG. 1.

DETAILED DESCRIPTION

Figure 8:
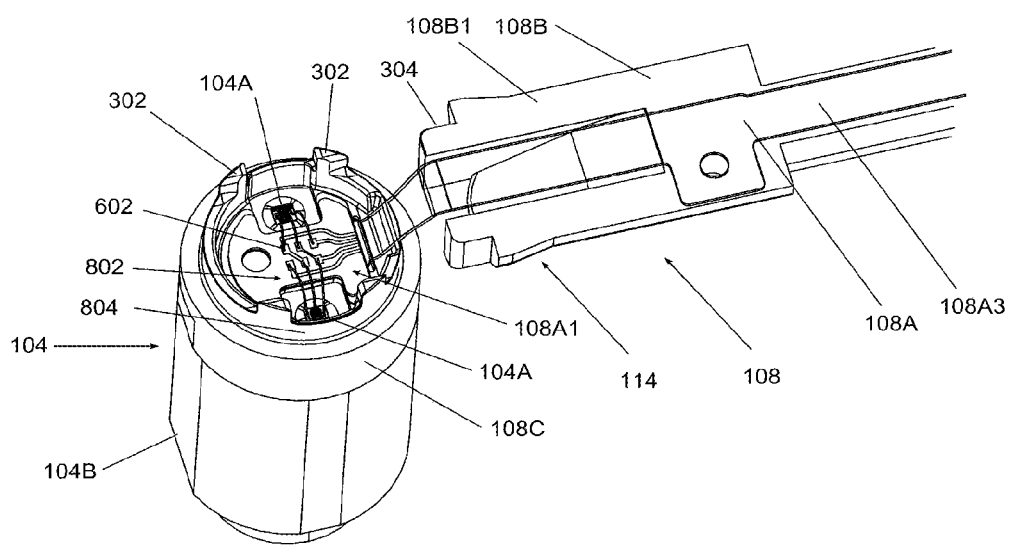
FIG. 8 shows a perspective view of the coupling between pressure sensing structure and interconnection structure.

FIG. 1 shows schematically a sectional view of an embodiment of a pressure-measuring plug 100 for a combustion engine. The pressure-measuring plug 100 comprises a hollow plug body 102 and a sensing structure 104. The pressure-measuring plug 100 further comprises a housing 110 which is provided with a hexagonal periphery (not shown) to enable the mounting of the pressure-measuring device with a wrench.

The hollow plug body 102 comprises top part 102D provided with an external thread 102D1 for mounting the plug body 102 into a cylinder head of a combustion engine. The top part 102D further comprises a structure to position electronic part electronic circuitry 106. This structure forms a distal end 102A of the hollow plug body 102. The hollow plug body 102 further comprises an intermediate part 102E which is positioned between the top part 102D and the pressure sensing structure 104. The intermediate part 102E is a radially symmetrical or cylindrical part that could be obtained by a metal cutting process. The hollow plug body 102 has a plug body axis 102C.

A sensing structure 104 forms a free end of the pressure measuring plug 100. The sensing structure 104 is coupled to a proximal end 102B of the hollow plug body 102. At least one electrical sensing element 104A is attached to a surface of a cylindrical body part 104B of the sensing structure 104 facing the space in the hollow plug body 102. The electrical sensing element 104A could be in the form of a number of strain gauges. The strain gauges are preferably piezo resistive sensing elements. More details about the functioning of the sensing structure are disclosed in EP2138819A1.

The housing 110 of the pressure measuring plug 100 forms a cavity to accommodate electronic circuitry 106. The electronic circuitry 106 is a printed circuit board (PCB) provided with electrical components. The electronic circuitry is arranged to perform at least one of the following actions: temperature compensation of a signal obtained from the pressure sensor, i.e. piezo-resistive element, calibration of the signal obtained from the at least one electrical sensing element, internal fault detection, converting the electrical signal(s) from the at least one electrical sensing element to a conditioned measurement signal, i.e. a signal indicative of the pressure in the combustion chamber. The electronic circuitry is located at the distal end 102A of the hollow plug body 104. In use, the electronic circuitry 106 is located outside the combustion engine. The temperature range outside the engine is less extreme than the temperature in the hollow plug body. This allows using components for the electronic circuitry which have less extreme requirements with respect to operating temperature. These components are less expensive than components that comply with an operating temperature range in accordance with the temperature range in the hollow plug body. In the present application the electronic circuitry is at distant location from the sensing structure, which creates a favorable temperature environment for the electronic circuitry.

The pressure-measuring plug further comprises an interconnection structure 108 configured to electrically connect the electrical sensing element 104A to the electronic circuitry 106. The distance between the electrical sensing element(s) 104A and the electronic circuitry 106 could be more than 100 mm. The interconnection structure 108 extends through the hollow plug body 10 from the electronic circuitry to the electrical sensing element(s) 104A.

The interconnection structure 108 comprises a flexible PCB 108A, an elongated support structure 108B and a ring-shaped support structure 108C. A Flexible PCB is a patterned arrangement to electronically connect electronic components using conductive pathways, tracks or signal traces forming a wire layer which is laminated onto a non-conductive flexible substrate. In the present application, the flexible PCB comprises one wire layer. It might be clear that a flexible PCB with more than one wire layer might be used. This could be advantageous if at least a part of the conditioning electronics is mounted on the flexible PCB. The elongated support structure 108B comprises a central axis which coincides with the plug body axis 102C. The elongated support structure is configured to fixate a part 108A3 of the flexible PCB in the hollow plug body 104. The elongated support structure reduces the length of the flexible PCB that could move due to vibrations due to the combustion engine. This increases the reliability of the electrical connection between electronic circuitry and electrical sensing element(s). During assembly of measuring plug, the elongated support structure facilitates to guide the flexible PCB though the hollow plug body.

The elongated support structure 108B comprises a first part 108B1 and a second part 108B2. The flexible PCB 108A is positioned between the first part 108B1 and the second part 108B2. Part 108A of flex PCB is laminated to the first part 108B1. The first part 108B1 comprises features for alignment and orientation to counter parts of the second part 108B2. The elongated support structure 108B comprises press fit features to secure the interconnection structure 108 in the measuring plug when the hollow plug body is shifted over the interconnection structure and attached to the ring-shaped support structure 108C.

A first press fit feature 114 is arranged at an end part of the elongated support structure 108 facing the sensing structure 104. The end part has a profile which is slightly larger than the space in the proximal end 102B of the hollow plug body 102. The space between the first and second part 108B1, 108B2 enables to end parts of the first and second part to move to each other to obtain a permanent press fitting by the generated stress in the first and second part 108B1, 108B2. Reference numerals 112 and 116 indicate the positions of a second and third press fit feature.

The ring-shaped support structure 108C is attached to a side of the cylindrical body part 104B of the sensing structure 104 facing the space in the hollow plug body 102. In the present embodiment, the ring-shaped support structure 108C is positioned between proximal end 102B of the hollow plug body 102 and the cylindrical body part 104B. The ring-shaped support structure 108C forms a part the exterior of the measuring plug 100. This enables to enlarge the space in the ring-shaped support structure 108C given a specific diameter of the plug body. The ring-shaped support structure is attached to a surface of the sensing structure 104 which does not deform when a pressure to be measured is acting on the measuring plug 100. Consequently, forces acting on the ring-shaped support structure will not influence the stress in the surface of the cylindrical body part 104B to which the electrical sensing elements 104A are attached.

The flexible PCB comprises a proximal end part 108A1 and a distal end part 108A2. Part 108A3 is located between the proximal end part 108A1 and the distal end part 108A2. FIG. 2 elucidates the course of the flexible PCB 108 in the pressure measuring plug. Part 108A3 of the flexible PCB 108 is in a plane which is parallel to the plug body axis 102C. Both the proximal end part 108A1 and the distal end part 108A2 are positioned in planes which are perpendicular to the plug body axis 102C.

FIG. 5 shows a top view of the distal end part 108A2 of the flexible PCB 108. Top view in the present context means seen from the wire layer side. The distal end part 108A2 comprises second contact areas. In the present embodiment, the number of contact areas is four. The distal end part is laminated on a metal plate (not shown). The metal plate is added to withstand the spiral spring load pressure. In the present embodiment, spiral contact springs are used to make the electrical connection between electronic circuitry 106 and the flexible PCB 108. The hole 410 in the flexible PCB and metal plate is used to have an exact positioning in the assembly for the spiral contact springs.

FIG. 6 shows a top view of the proximal end part 108A1. The proximal end part 108A1 comprises first contacts areas 602. In the present application the number of contact areas is four. It might be clear that the flex PCB between the proximal end part and the distal end part comprises four traces forming the electrical connections between the first and second contact areas. The electrical sensing element(s) are electrically coupled to the first contacts areas 602 by bonding wires. The proximal end part 108A1 further comprises an alignment feature 604 to align the proximal end part 108A1 with respect to the ring-shaped support structure 108C when attaching the proximal end part 108A1 on the ring-shaped support structure 108C. The proximal end part 108A1 comprises four protruding areas 606 to enlarge the contact area to laminate the flex PCB to the ring-shaped support structure 108C.

FIG. 3 shows a side view of an assembly comprising the sensing structure 104 and the interconnection structure 108. The assembly is seen from the side of the second part 108B2 of the elongated support structure 108B. This view corresponds to view in FIG. 1 wherein the measuring plug 100 is rotated 90 degrees. This assembly is obtained in the production process prior to the step wherein the plug body is slit over the elongated support structure 108. FIG. 3 shows an alignment structure 302 of the ring-shaped support structure 108C and a counter alignment structure 304 of the elongated support structure 108B. The alignment structures 302, 304 ensure that the ring-shaped support structure 108C angularly aligned with respect to the body axis of the elongated support structure 108B. This reduces the amount of stress due to warp in the flexible PCB 108A, as the alignment structure 302, 304 also aligns the angular orientation of the proximal end part 108A1 of the flexible PCB 108A with respect to part 108A3 of the flexible PCB 108A.

The second part 108B2 further comprises a groove 306. This groove 306 angularly aligns the top part 102A and the interconnection structure 108. The cooperation between groove 306 and corresponding ridge on the inner side of the top part 102A prevents that the elongated support structure 108B could move in axial direction. FIG. 7 shows a cross sectional view of the top part 102A and the interconnection structure along the line VII-VII in FIG. 1. FIG. 7 shows further that the elongated support structure 108B and the top part 102A comprises an additional angular alignment feature. This additional alignment feature is formed by the flattening of both the profile of the elongated support structure 108B and the top part 102A.

FIG. 4 shows a perspective view of parts of the interconnection structure. In FIG. 4 the flexible PCB 108A3 is attached to the first part 108B1 of the elongated support structure 108B. The first part 108B1 and second part 108B2 comprises two snap-fitting structures 402 to attach the second part 108B2 to the first part 108B1. The first part 108B1 and the second part 108B2 further comprise an alignment feature 404. The second part 108B2 further comprises elevations 414 which ensure that after snap-fitting of the first part and second part there is always stress in the assembly as a result of which the assembly of first part, second part and part 108A3 of the flexible PCB could withstand the vibration requirements.

The second part 108B2 comprises a protruding edge 406 at the end. The protruding edge 406 takes care that the distal end part 108A2 of the flexible PCB 108 is pre-bent for the insertion into the assembly and to have a start bent for the final one into the correct direction. Reference numeral 412 indicates the metal plate on which the distal end part 108A2 is laminated. The distal end part 108A2 further comprises a section 408 which extends over the metal plate 412. When positioning the distal end part 108A2 on the top part of the hollow plug body 102, section 408 of the flex PCB is bent against the flipping direction and 408 prevents that the distal end part 108A2 will bend back during assembly of the measuring plug.

FIG. 8 shows an enlarged perspective view of the coupling between pressure sensing element 104 and the interconnection structure 108. It shows the state after the wire bonding process. In this state, the ring-shaped support structure 108C of the interconnection structure 108 is attached to the cylindrical body part 104B of the sensing structure 104. The attachment could be made by welding. The proximal end part 108A1 of the flexible PCB 108 is laminated to a flat metal disc having a shape which is corresponding to the proximal end part 108A1. The flat metal disc is assembled in the ring-shaped support structure 108C by means of adhesive. A special glue pattern is used to obtain the desired pull off force. It has been found that a dot of glue below each protruding area of the flat metal disc provides the optimal pull off force. The assembly is robust to accept the wire-bond process.

After the ring-shaped support structure 108C is attached to the sensing structure 104, the elongated support structure 108B is moved in a position which makes the proximal end part 108A1 accessible for a wire binding system. FIG. 8 shows such a position wherein the length axis of the first part 108B1 is perpendicular to the body axis of the pressure sensing structure 104. It should be noted that the proximal end part 108A1 is also in a plane which is perpendicular to the body axis of the pressure sensing structure 104. Subsequently, the wire bonding system makes the electrical connection between corresponding contact areas of the electrical sensing elements 104A and the contact areas 602 on the proximal end part 108A1 by means of bonding wires 802.

The ring-shaped support structure 108C further comprises a circular projection 804 which forms a wall around the surface to which the flat metal disc is attached. In this way, the assembly of ring-shaped support structure 108C and sensing structure 104 forms a cavity housing the electrical sensing elements 104A, the proximal end of the flexible PCB 108A1 and the bonding wires 802. After the bonding wires are mounted, the cavity is filled with a protective wire bond gel.

Four protrusions 302 are provided on top of the circular projection 804. These protrusions 302 form an alignment structure of the ring-shaped support structure 108C. The proximal end of the elongated support structure 108B comprises a counter alignment structure 304 in the form of recesses. The alignment structures 302,304 align the elongated support structure 108B on the ring-shaped support structure 108C in/during further assembly stages of the measuring plug. After the wire bonding stage, the elongated support structure 108B is positioned on the ring-shaped support structure 108C as a result of which the body axis of the elongated support structure 108B is brought in line with the body axis of the sensing element 104. This stage is shown in FIG. 3. Now, the direction of the elongated support structure 108B is perpendicular to the proximal end part 108A1 of the flexible PCB 108. In a subsequent action, the hollow plug body 102 is shifted over the elongated support structure 108B. The hollow plug body is then attached to the ring-shaped support structure 108C by means of welding. After this, the distal end part 108A2 protrudes out of the hollow plug body 102.

It should be noted that the flexible PCB could be laminated on the metal plate at the distal end part of the flexible PCB, first part of the elongated support structure, and the metal disc at the proximal end part of the flexible PCB in the same process step.

It should further be noted that after wire bonding the second part 108B2 of the elongated support structure 108B could be attached to the first part 108B1, when there is not enough room available for the wire bonding process. If enough room is available for the wire bonding process, the interconnection structure 108 could be pre-assembled completely. In that case, the elongated support structure 108B could be attached to the flexible PCB 108A by an overmolding process.

In the embodiment described before, the flexible PCB comprises four leads from the proximal end 108A1 to the distal end 108A2 of the flexible PCB. In another embodiment, at least a part of the electrical components of the electronic circuitry forming the conditioning electronics are mounted on the flexible PCB. As a consequence, the elongated support structure comprises one or more recesses forming cavities in the elongated support structure to house the electrical components. Furthermore, to have a compact layout, the flexible PCB has two or more wire layers two connect the electrical components mounted on the flexible PCB. In an embodiment all components of the conditioning electronics are mounted on the flexible PCB. Now the interconnection structure forms one assembly that is placed in the hollow plug body and couples electrically the bonding wires at the proximal end of the plug body to the connector terminals in the housing at the distal end of the plug body.

Described is a design of an interconnection system to separate the electrical sensing element form the signal conditioning electronic circuitry over a relative long distance. In this way, the electronic circuitry is protected for thermal overload. The interconnection system withstands the automotive engine cylinder temperature and vibrations and is suitable for high volume assembly and common processes. The proximal end 108A1 of a 2D laminated flex assembly is mounted into a metal support ring 108C. The 2D laminated flex assembly is a combination of a flexible PCB 108A, metal parts and plastic parts. The metal parts are the metal plate 412 which is laminated to the distal end part 108A2 and the metal disc which is laminated to the proximal end part 108A1. The plastic parts are the first and second part 108B1, 108B2 of the elongated support structure 108B. The interconnection structure 108 meets the automotive temperature and vibration requirements. The electrical connection at the end of the sensing structure is done by means of wire bonding. The connection at the other end is done by means of spring contacts. It might be clear that other connection types at the other end are possible. The design is applicable for different lengths a variety of engine head lay-outs and other measuring plug sensors wherein the sensor is located at one end of the plug body and the conditioning sensor electronics is located at the other end of the plug body or in the plug body.

While the invention has been described in terms of several embodiments, it is contemplated that alternatives, modifications, permutations and equivalents thereof will become apparent to those skilled in the art upon reading the specification and upon study of the drawings. The invention is not limited to the illustrated embodiments. Changes can be made without departing from the idea of the invention.

What is claimed is:
1. A measuring plug comprising:
   a hollow plug body comprising a proximal end, a distal end and a plug body axis;
   a sensing structure comprising at least one electrical sensing element, the sensing structure located at the proximal end of the hollow plug body; and connector terminals arranged in a housing which is attached to the distal end of the hollow plug body, the connector terminals electrically coupled by electronic circuitry and bonding wires to the at least one electrical sensing element;

the measuring plug further comprising an interconnection structure providing an electrical connection through the hollow plug body;

the interconnection structure comprising a flexible printed circuit board (PCB) with first contact areas at a proximal end part of the flexible PCB and second contact areas at a distal end part of the flexible PCB;

the first contact areas electrically coupled to the electrical sensing end element by bonding wires, the proximal end part of the flexible PCB positioned in the hollow plug body in a plane which is perpendicular to the plug body axis;

the interconnection structure further comprising an elongated support structure configured to fixate a part of the flexible PCB between the proximal and distal end of the flexible PCB in the hollow plug body, the elongated support structure comprising a first part and a second part and the flexible PCB is positioned between the first part and the second part, the first part and the second part comprising a snap fit coupling structure to couple the first part to the second part.

2. The measuring plug of claim 1 wherein the interconnection structure further comprises a ring-shaped support structure wherein the proximal end of the flexible PCB is attached to the ring-shaped support structure and the ring-shaped support structure is attached to the sensing structure.

3. The measuring plug of claim 2 wherein the ring-shaped support structure comprises an alignment structure to cooperate with a corresponding alignment structure of the elongated support structure, the alignment structure configured to align the part of the flexible PCB and the proximal end part of the flexible PCB.

4. The measuring plug of claim 3 wherein the ring-shaped support structure and the sensing structure form a cavity housing the electrical sensing element, the proximal end of the flexible PCB and the bonding wires, the cavity configured to hold together a protective gel.

5. The measuring plug of claim 4 wherein the ring-shaped support structure forms a part of the exterior of the measuring plug.

6. The measuring plug of claim 5 wherein the elongated support structure comprises a protruding edge configured to pre-bend the flex.

7. The measuring plug of claim 6 wherein the elongated support structure comprises a press fit structure to fixate the elongated support structure in the hollow plug body.

8. The measuring plug of claim 7 wherein the hollow plug body comprises a top part with a structure to position the electronic circuitry and a through hole providing a passage for the interconnection structure, the through hole and the elongated support structure comprising corresponding alignment structures configured to align the top part with the elongated support structure.

9. The measuring plug of claim 8 wherein at least a part of the electronic circuitry is mounted on the flexible PCB.

10. The measuring plug of claim 9 wherein the sensing structure is a pressure sensing structure and the electrical sensing element comprises a number of strain gauges.

11. A method of assembling a measuring plug comprising:

providing an interconnection structure comprising a flexible printed circuit board (PCB) with first contact areas at a proximal end part of the flexible PCB and second contact areas at a distal end part of the flexible PCB and an elongated support structure configured to fixate a part of the flexible PCB between the proximal end part and distal end part of the flexible PCB in a hollow plug body, the elongated support structure comprising a first part and a second part and the flexible PCB is positioned between the first part and the second part, the first part and the second part comprising a snap fit coupling structure to couple the first part to the second part;

mechanically coupling the interconnection structure to a sensing structure;

moving the elongated support structure in a position which makes the proximal end part accessible for a wire bonding system;

electrically coupling the first contact areas to an electrical sensing element of the sensing structure by means of bonding wires;

positioning the elongated support structure perpendicular to the proximal end part of the flexible PCB; and sliding the interconnection structure in a hollow plug body enabling the proximal end of the flexible PCB to be positioned in the hollow plug body in a plane that is perpendicular to a plug body axis and the distal end to protrude out of the hollow plug body for further assembly.

* * * * *